(12) United States Patent
Matsushima et al.

(10) Patent No.: US 7,760,295 B2
(45) Date of Patent: Jul. 20, 2010

(54) LIQUID CRYSTAL DISPLAY DEVICE AND ELECTRONIC APPARATUS

(75) Inventors: Toshiharu Matsushima, Suwa (JP); Hitoshi Tsuchiya, Suwa (JP)

(73) Assignee: Sony Corporation, Tokyo (JP)

(*) Notice: Subject to any disclaimer, the term of this patent is extended or adjusted under 35 U.S.C. 154(b) by 557 days.

(21) Appl. No.: 11/484,560

(22) Filed: Jul. 12, 2006

(65) Prior Publication Data

US 2007/0013835 A1    Jan. 18, 2007

(30) Foreign Application Priority Data

Jul. 15, 2005    (JP)    ............... 2005-206529
Feb. 13, 2006    (JP)    ............... 2006-034757

(51) Int. Cl.
*G02F 1/1335*    (2006.01)
(52) U.S. Cl. ..................................... 349/113
(58) Field of Classification Search ........... 349/113
See application file for complete search history.

(56) References Cited

U.S. PATENT DOCUMENTS

| | | | |
|---|---|---|---|
| 6,281,952 B1* | 8/2001 | Okamoto et al. | 349/12 |
| 6,342,939 B1* | 1/2002 | Hirata et al. | 349/143 |
| 6,563,554 B2 | 5/2003 | Okamoto et al. | |
| 6,914,656 B2 | 7/2005 | Sakamoto et al. | |
| 7,486,351 B2* | 2/2009 | Itou et al. | 349/99 |
| 2005/0105033 A1 | 5/2005 | Itou et al. | |
| 2005/0128389 A1* | 6/2005 | Yang | 349/114 |
| 2005/0264720 A1 | 12/2005 | Itou et al. | |

FOREIGN PATENT DOCUMENTS

| | | |
|---|---|---|
| JP | A 62-069234 | 3/1987 |
| JP | A-62-069234 | 3/1987 |
| JP | A 11-202356 | 7/1999 |
| JP | A 11-242226 | 9/1999 |
| JP | A-2003-270631 | 9/2003 |
| JP | A-2003-344837 | 12/2003 |
| JP | A-2004-012964 | 1/2004 |
| JP | A-2004-294800 | 10/2004 |
| JP | A-2005-115282 | 4/2005 |
| JP | A-2005-338264 | 12/2005 |

* cited by examiner

*Primary Examiner*—Uyen-Chau N Le
*Assistant Examiner*—Hoang Tran
(74) *Attorney, Agent, or Firm*—K&L Gates LLP (57) ABSTRACT

A liquid crystal display device includes a first substrate and a second substrate opposed to each other with a liquid crystal layer having liquid crystal molecules disposed therebetween, in which a first electrode and a second electrode are provided on a side of the first substrate opposed to the liquid crystal layer, the liquid crystal layer is driven by means of an electric field generated between the first electrode and the second electrode, and a reflective display area for reflective display and a transmissive display area for transmissive display are formed in a sub-pixel area. Alignment of the liquid crystal molecules of the liquid crystal layer is different in the transmissive display area and the reflective display area.

9 Claims, 9 Drawing Sheets

| | | α(°) | θ(°) | φ1(°) | φ2(°) | d(μm) |
|---|---|---|---|---|---|---|
| TRANSMISSION | 1 | — | 85 | — | — | 3.5 |
| TRANSMISSION | 2 | — | 75 | — | — | 3.5 |
| REFLECTION | 3 | 90 | — | 85 | -30 | 2 |
| REFLECTION | 4 | 110 | — | 85 | -30 | 2 |
| REFLECTION | 5 | 120 | — | 85 | -30 | 2 |
| REFLECTION | 6 | 130 | — | 85 | -30 | 2 |
| REFLECTION | 7 | 150 | — | 85 | -30 | 2 |
| REFLECTION | 8 | 90 | — | 60 | -50 | 2.56 |
| REFLECTION | 9 | 115 | — | 60 | -50 | 2.56 |

LIQUID CRYSTAL DISPLAY DEVICE AND ELECTRONIC APPARATUS

This application claims priority from Japanese Patent Application Nos. 2005-206529 and 2006-34757, filed in the Japanese Patent Office on Jul. 15, 2005 and Feb. 13, 2006, respectively, the entire disclosures of which are hereby incorporated by reference.

BACKGROUND

1. Technical Field

The present invention relates to a liquid crystal display device and an electronic apparatus.

2. Related Art

As an example of a mode of a liquid crystal device, a mode (hereinafter, referred to as a "transverse electric field mode") of controlling alignment of liquid crystal molecules by applying a substrate-in-plane electric field to a liquid crystal layer is known. An in-plane switching (IPS) mode and a fringe-field switching (FFS) mode that depend upon the shapes of the electrodes for generating an electric field are also known. For example, a liquid crystal display device with a transverse electric field mode (FFS mode) in which pectinated electrodes are provided in upper and lower layers with a dielectric layer disposed therebetween is disclosed in JP-A-11-202356.

Transflective liquid crystal display devices have been used as display units of mobile electronic apparatuses such as mobile phones or personal digital assistants, and liquid crystal display devices with a twisted nematic (TN) mode or a vertical aligned nematic (VAN) mode are often used. Such known transflective liquid crystal display devices employ a structure (so-called multi-gap structure) in which the thickness of a liquid crystal layer is different in a reflective display area and a transmissive display area of a dot area so as to obtain both excellent reflective display and transmissive display.

Accordingly, the inventors studied the application of a transverse electric field mode which is advantageous in terms of viewing angle or image quality to transflective liquid crystal display devices. As a result, it was found out that liquid crystal display devices with a transverse electric field mode cannot provide both excellent reflective display and transmissive display, not only when a reflective layer is formed on a dot but also when a multi-gap structure is used.

SUMMARY

An advantage of the present invention is that it provides a liquid crystal display device with a transverse electric field mode, which can display an image with high quality for both reflective display and transmissive display, which has a high degree of freedom in design change, and which can easily be applied to a variety of apparatuses.

According to an aspect of the invention, there is provided a liquid crystal display device comprising a first substrate and a second substrate opposed to each other with a liquid crystal layer having liquid crystal molecules disposed therebetween, in which a first electrode and a second electrode are provided on a side of the first substrate opposed to the liquid crystal layer, the liquid crystal layer is driven by means of an electric field generated between the first electrode and the second electrode, and a reflective display area for reflective display and a transmissive display area for transmissive display are formed in a sub-pixel area, wherein alignment of the liquid crystal molecules of the liquid crystal layer is different in the transmissive display area and the reflective display area.

According to this configuration, it is possible to embody the same display in the reflective display area at the time of no application of a voltage, similarly to the transmissive display area. Accordingly, it is not necessary to use any additional constituent element, and thus it is possible to embody reflective display without damaging the transmissive display.

In the liquid crystal display device according to an aspect of the invention, the alignment may be a parallel alignment in the transmissive display area and may be a twisted alignment in the reflective display area.

According to this configuration, it is possible to enhance the degree of freedom for making the alignment direction constant in the reflective display area and the transmissive display area and thus to easily manufacture the liquid crystal display device.

In the liquid crystal display device according to an aspect of the invention, a twist angle in the reflective display area may be in the range of 0° to 80° and the product ($\Delta$nd) of a cell thickness (d) and a refractive index difference ($\Delta$n) may be in the range of 120 nm to 320 nm. Accordingly, it is possible to embody excellent normally black display in both of the reflective display area and the transmissive display area.

In the liquid crystal display device according to an aspect of the invention, the twist angle in the reflective display area may be in the range of 0° to 73° and the product ($\Delta$nd) of the cell thickness (d) and the refractive index difference ($\Delta$n) may be in the range of 140 nm to 261 nm. Accordingly, it is possible to embody further excellent normally black display in both of the reflective display area and the transmissive display area.

Coloring resulting from different $\Delta$nd depending upon colors is visible in the reflective display area at the time of black display. As a result, when the reflective display is performed with a color filter, the cell thickness may be adjusted so as to be $\Delta$nd corresponding to the colors.

In the liquid crystal display device according to an aspect of the invention, an angle of the first electrode may be different in the reflective display area and the transmissive display area. Angles of the first electrode and the second electrode may be different in the reflective display area and the transmissive display area. By adjusting the angles of the electrodes and the alignment direction of the liquid crystal molecules, it is possible to easily embody a transflective liquid crystal display device with proper optical design for the reflective display and the transmissive display.

In the liquid crystal display device according to an aspect of the invention, a voltage applied between the first electrode and the second electrode may be different in the reflective display area and the transmissive display area. As a result, it is possible to more easily embody a transflective liquid crystal display device with proper optical design for the reflective display and the transmissive display.

In the liquid crystal display device according to an aspect of the invention, a tilting direction of the liquid crystal molecules at the time of application of a voltage between the first electrode and the second electrode in the transmissive display area and a tilting direction of the liquid crystal molecules at the time of application of a voltage between the first electrode and the second electrode in the reflective display area may be equal to each other. Accordingly, since the variation in alignment of the liquid crystal molecules at the time of application of a selection voltage can be made constant in the reflective display area and the transmissive display area, it is possible to suppress occurrence of disclination between the reflective display area and the transmissive display area and it is thus possible to provide a liquid crystal display device with high brightness and high responsibility.

In the liquid crystal display device according to an aspect of the invention, the first electrode may have a plurality of band-shaped electrodes extending in the sub-pixel area, and the extension direction of the plurality of band-shaped electrodes in the reflective display area may be disposed between an alignment regulation direction of an alignment layer on the side of the first substrate and an alignment regulation direction of an alignment layer on the side of the second substrate as seen two-dimensionally. Accordingly, since the tilting direction of the liquid crystal display molecules due to an electric field generated between the first electrode and the second electrode can be made constant in the transmissive display area and the reflective display area, it is possible to suppress occurrence of disclination in the boundary between the transmissive display area and the reflective display area.

According to another aspect of the invention, there is provided an electronic apparatus comprising the liquid crystal display device according to an aspect of the invention described above. According to this configuration, the electronic apparatus can have a display unit with high brightness and high contrast.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a liquid crystal display device 100 according to a first embodiment of the present invention will be described with reference to the drawings. The liquid crystal display device 100 according to the first embodiment employs a fringe field switching (FFS) mode among transverse electric field modes which display an image by applying an electric field (transverse electric field) to liquid crystal molecules in an in-plane direction of a substrate to control alignment of the liquid crystal molecules.

The liquid crystal display device 100 according to the first embodiment is a color liquid crystal display device having a color filter on the substrate, in which three sub-pixels emitting colored light components of red (R), green (G), and blue (B) form a pixel. Accordingly, a display area serving as a unit constituting display is referred to as a "sub-pixel area" and a display area including a set of sub-pixels (R, G, and B) is referred to as a "pixel area."

Figure 1:
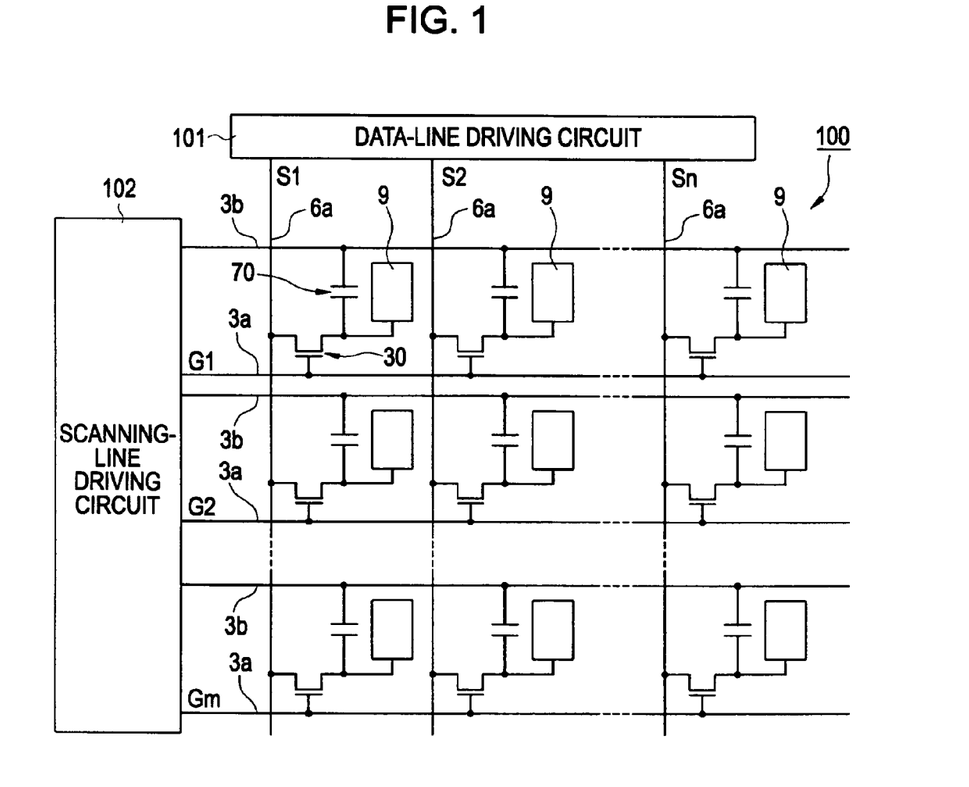
FIG. 1 is a circuit diagram illustrating a liquid crystal display device according to a first embodiment of the invention.
Figure 2A:
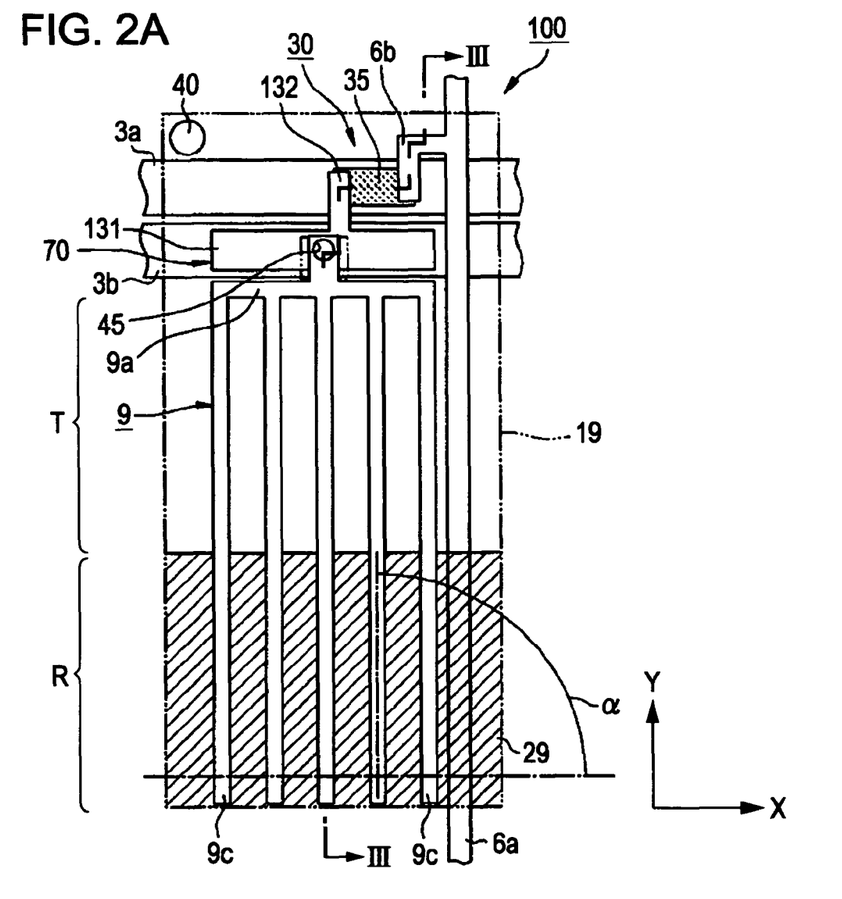
FIG. 2A is a plan view illustrating a sub-pixel area according to the first embodiment and FIG. 2B is an explanatory diagram illustrating an arrangement of optical axes of the liquid crystal display device shown in FIG. 2A.
Figure 2B:
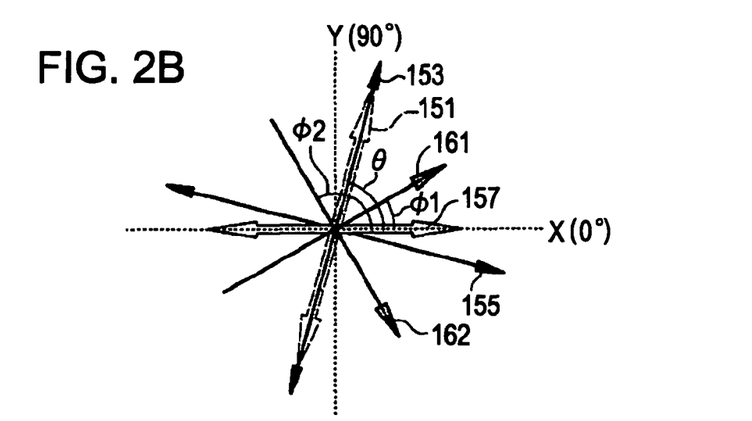
Figure 3:
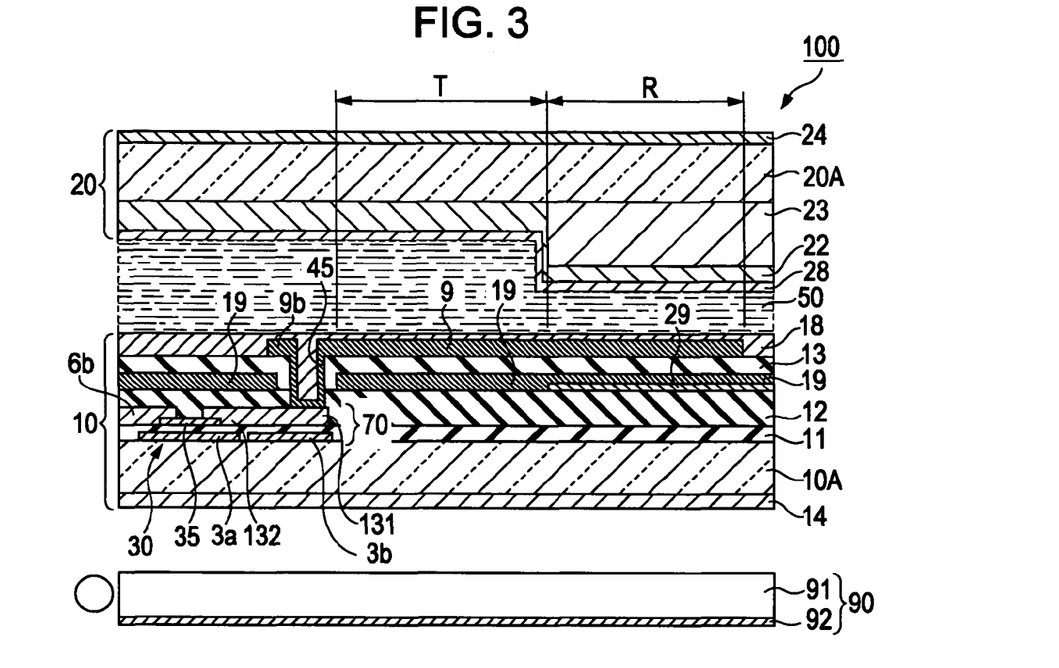
FIG. 3 is a partially sectional view taken along Line A-A'.
Figure 4:
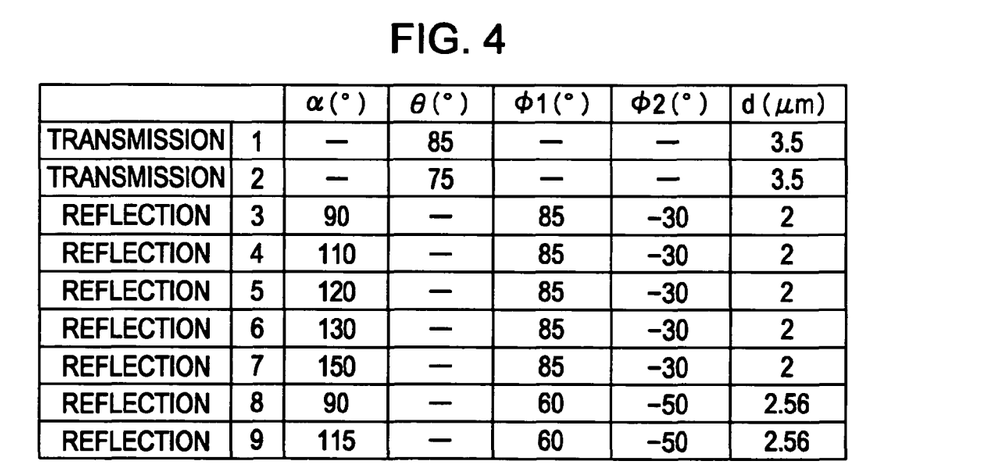
FIG. 4 is an explanatory diagram illustrating angular relationships of elements according to the first embodiment.

FIG. 1 is a circuit diagram illustrating a plurality of sub-pixel areas arranged in a matrix shape in the liquid crystal display device 100 according to the first embodiment. FIG. 2A is a plan view illustrating a sub-pixel area in the liquid crystal display device 100 and FIG. 2B is a diagram illustrating arrangement of optical axes in FIG. 2A. FIG. 3 is a partially sectional view taken along Line A-A' of FIG. 2A and FIG. 4 is an explanatory diagram illustrating operational effects according to the first embodiment. As shown in FIG. 3, the liquid crystal display device 100 according to the first embodiment is a transflective liquid crystal display device including a TFT array substrate (first substrate) 10 and a counter substrate (second substrate) 20 opposed to each other and a liquid crystal layer 50 interposed between both substrates 10 and 20, in which a backlight 90 is disposed outside the TFT array substrate 10.

Incidentally, layers or members are shown in different scales in the drawings so as to make it possible to recognize the layers or members from the drawings.

As shown in FIG. 1, in each of a plurality of sub-pixel areas formed in a matrix shape to constitute an image display area of the liquid crystal display device 100, a pixel electrode 9 and a TFT 30 electrically connected to the pixel electrode 9 so as to allow switching of the pixel electrode are formed, and a data line 6a extending from a data-line driving circuit 101 is electrically connected to the source of the TFT 30. The data-line driving circuit 101 supplies image signals S1, S2, . . . , and Sn to the pixels through the data lines 6a. The image signals S1, S2, . . . , and Sn may be line-sequentially supplied in this order, or may be supplied to the data lines 6a adjacent to each other in units of a group.

The gate of the TFT 30 is electrically connected to a scanning line 3a extending from a scanning-line driving circuit 102. Scanning signals G1, G2, . . . , and Gm supplied pulse-like to the scanning lines 3a from the scanning-line driving circuit 102 at a predetermined time are line-sequentially applied to the gates of the TFTs 30 in this order. The pixel electrode 9 is electrically connected to the drain of the TFT 30. By turning on the TFT 30 as a switching element in response to input of the scanning signals G1, G2, . . . , and Gm only for a predetermined time, the image signals S1, S2, . . . , and Sn supplied from the data lines 6a are written to the pixel electrodes 9 at predetermined times.

The image signals S1, S2, . . . , and Sn with a predetermined level supplied to the liquid crystal through the pixel electrodes 9 are retained between the pixel electrodes 9 and a common electrode opposed to the pixel electrodes with the liquid crystal disposed therebetween for a predetermined time. Here, in order to prevent the retained image signals from leaking, a storage capacitor 70 is connected in parallel to a liquid crystal capacitor formed between the pixel electrode 9 and the common electrode. The storage capacitor 70 is disposed between the drain of the TFT 30 and a capacitor line 3b.

As shown in FIG. 2A, the pixel electrode (first electrode) 9 which is formed in a substantially rake shape (pectinated shape) as seen two-dimensionally and is longitudinal in the Y axis direction and the common electrode (second electrode) 19 which is disposed to two-dimensionally overlap with the pixel electrode 9 and has a substantially two-dimensional solid shape are formed in each sub-pixel area of the liquid crystal display device 100. In the upper-left corner of the sub-pixel area (or in the boundary with an adjacent sub-pixel area) shown in the figure, a pillar-shaped spacer 40 for keeping the TFT array substrate 10 and the counter substrate 20 separated from each other with a predetermined gap is vertically provided.

The pixel electrode 9 has a plurality of (five in the figure) band-shaped electrodes (branched electrodes) 9c extending in the Y axis direction, stem electrodes 9a which are electrically connected (short-circuits) to the band-shaped electrodes (branched electrodes) 9c at the upper ends (+Y side) thereof in the figure and extend in the X axis direction, and a contact portion 9b extending in the +Y axis direction from the center in the X axis direction of the stem electrode 9a.

The common electrode 19 is formed to cover a reflective layer 29 partially formed in the sub-pixel area shown in FIG. 2A. In the first embodiment, the common electrode 19 is a conductive film formed of a transparent conductive material such as ITO (Indium Tin Oxide), and the reflective layer 29 is formed of a reflective metal film such as aluminum or silver, or a dielectric laminated film (dielectric mirror) formed by stacking dielectric films ($SiO_2$ and $TiO_2$) having different refractive indexes. The liquid crystal display device 100 preferably has a function of scattering the light reflected by the reflective layer 29. In this case, it is possible to enhance visibility of the reflective display.

In addition, the common electrode 19 may employ not only a in which is formed to cover the reflective layer 29 as in the first embodiment, but also a structure in which a transparent electrode formed of a transparent conductive material and a reflective electrode formed of a reflective metal material are two-dimensionally partitioned, that is, a structure in which a transparent electrode disposed to correspond to the transmissive display area and a reflective electrode disposed to correspond to the reflective display area are partitioned, which are electrically connected to each other (in the boundary) between the reflective display area and the transmissive display area. In this case, the transparent electrode and the reflective electrode form a common electrode for generating an electric field along with the pixel electrode 9, and the reflective electrode also serves as the reflective layer of the sub-pixel area.

In each sub-pixel area, the data line 6a extending in the Y axis direction, the scanning line 3a extending in the X axis direction, and the capacitor line 3b being adjacent to the scanning line 3a and extending parallel to the scanning line 3a are formed. The TFT 30 is formed to correspond to an intersection between the data line 6a and the scanning line 3a. The TFT 30 includes a semiconductor layer 35 which is partially formed in a plane area of the scanning line 3a and is formed of amorphous silicon, and a source electrode 6b and a drain electrode 132, parts of which are formed to two-dimensionally overlap with the semiconductor layer 35. The scanning line 3a serves as a gate electrode of the TFT 30 at a position which two-dimensionally overlaps with the semiconductor layer 35.

The source electrode 6b of the TFT 30 has a two-dimensional L shape which is branched from the data line 6a and extends to the semiconductor layer 35. The drain electrode 132 extends in the −Y direction, and is electrically connected to the capacitor electrode 131 having a substantially rectangular shape as seen two-dimensionally. On the capacitor electrode 131, the contact portion 9b of the pixel electrode 9 is formed to extend from the −Y side, and the capacitor electrode 131 and the pixel electrode 9 are electrically connected to each other through a pixel contact hole 45 formed at a position where both two-dimensionally overlap with each other. The capacitor electrode 131 is disposed in the plane area of the capacitor line 3b, thereby forming a storage capacitor 70 using the capacitor electrode 131 and the capacitor line 3b opposed to each other in the thickness direction at the same position as electrodes thereof.

As seen from the sectional structure shown in FIG. 3, the liquid crystal display device 100 has a in which the liquid crystal layer 50 is interposed between the TFT array substrate (first substrate) 10 and the counter substrate (second substrate) 20 opposed to each other. The liquid crystal layer 50 is sealed between both substrates 10 and 20 by the use of a seal member (not shown) formed along the edges of the area in which the TFT array substrate 10 and the counter substrate 20 are opposed to each other. A backlight (lighting device) 90 having a light waveguide 91 and a reflective plate 92 is provided on the rear surface side (lower side in the figure) of the TFT array substrate 10.

The TFT array substrate 10 has a substrate body 10A formed of glass, quartz, or plastic as a base body. The scanning line 3a and the capacitor line 3b are formed on the inner surface (the side opposed to the liquid crystal layer 50) of the substrate body 10A and a gate insulating layer 11 is formed to cover the scanning line 3a and the capacitor line 3b.

The semiconductor layer 35 formed of amorphous silicon is formed on the gate insulating layer 11 and the source electrode 6b and the drain electrode 132 are formed so that parts thereof are placed on the semiconductor layer 35. The capacitor electrode 131 is formed integrally with the drain electrode 132 on the right side of the figure. The semiconductor layer 35 is opposed to the scanning line 3a with the gate insulating layer 11 therebetween and the scanning line 3a forms the gate electrode of the TFT 30 at the opposed area. The capacitor electrode 131 is opposed to the capacitor line 3b with the gate insulating layer 11 disposed therebetween and the storage capacitor 70 using the gate insulating layer 11 as a dielectric layer is formed at the area where the capacitor electrode 131 and the capacitor line 3b are opposed to each other.

A first interlayer insulating layer 12 is formed to cover the semiconductor layer 35, the source electrode 6b, the drain electrode 132, and the capacitor electrode 131, and the reflective layer 29 is formed on a part of the first interlayer insulating layer 12. The common electrode 19 formed of a transparent material such as ITO is formed to cover the reflective layer 29 and the first interlayer insulating layer 12.

Accordingly, in the liquid crystal display device 100 according to the first embodiment, in the sub-pixel area shown in FIG. 2, an area other than the formation area of the reflective layer 29 in the plane area where the plane area including the pixel electrode 9 and the plane area including the common electrode 19 overlap with each other serves as the transmissive display area T which displays an image by modulating light irradiated from the backlight 90 and passing through the liquid crystal layer 50. An area where the plane area including the pixel electrode 9 and the plane area including the reflective layer 29 two-dimensionally overlap with each other serves as the reflective display area R which displays an image by reflecting and modulating light irradiated from the outside of the counter substrate 20 and passing through the liquid crystal layer 50.

A resin layer having unevenness formed on the surface thereof may be provided between the first interlayer insulating layer 12 and the reflective layer 29. The resin layer can provide a light scattering property to the reflective layer 29, thereby enhancing the visibility of the reflective display.

A second interlayer insulating layer 13 formed of silicon oxide or the like is formed to cover the common electrode 19 and the pixel electrode 9 formed of a transparent conductive material such as ITO is formed on the surface of the second interlayer insulating layer 13 opposed to the liquid crystal layer. Alignment layers 18 formed of polyimide or silicon oxide are formed to cover the pixel electrode 9 and the second interlayer insulating layer 13.

A pixel contact hole 45 passing through the first interlayer insulating layer 12 and the second interlayer insulating layer 13 and reaching the capacitor electrode 131 is formed, and the pixel electrode 9 and the capacitor electrode 131 are electrically connected to each other by burying a part of the contact portion 9b of the pixel electrode 9 in the pixel contact hole 45. An opening is formed in the common electrode 19 to correspond to the formation area of the pixel contact hole 45, the pixel electrode 9 and the capacitor electrode 131 are electrically connected to each other through the opening, and the common electrode 19 and the pixel electrode 9 are not electrically connected to each other.

On the other hand, the counter substrate 20 has a substrate body 20A formed of glass, quartz, or plastic as a base body, and a color filter 22 and a step-forming layer 23 formed of acryl for forming a multi-gap structure are provided on the inner surface side (on the side opposed to the liquid crystal layer 50) of the substrate body 20A. An alignment layer 28 formed of polyimide or silicon oxide is formed on the color filter 22.

The color filter 22 is formed of a color material layer corresponding to a display color of each sub-pixel, but the sub-pixel area may be partitioned into two or more areas having different chromaticities. For example, a in which a first color material area formed to correspond to the plane area of the transmissive display area T and a second color material area formed to correspond to the plane area of the reflective display area R are individually provided may be employed. In this case, by setting the chromaticity of the first color material area to be greater than the chromaticity of the second color material area, it is possible to prevent the chromaticity of display light from varying in the transmissive display area T where the display light passes through the color filter 22 only one time and the reflective display area R where the display light passes through the color filter 22 two times, thereby making visual quality constant in the transmissive display and the reflective display.

In the first embodiment, the liquid crystal constituting the liquid crystal layer 50 has a refractive anisotropy of $\Delta n=0.1$ and a positive dielectric anisotropy of $\Delta \in =11.3$. The thickness of the liquid crystal layer in the transmissive display area T is 3.5 μm and the thickness of the liquid crystal layer in the reflective display area R is d. Polarizing plates 14 and 24 are disposed on the outer surfaces (the sides opposite to the liquid crystal layer) of the substrate bodies 10A and 20A, respectively.

Figure 9A:
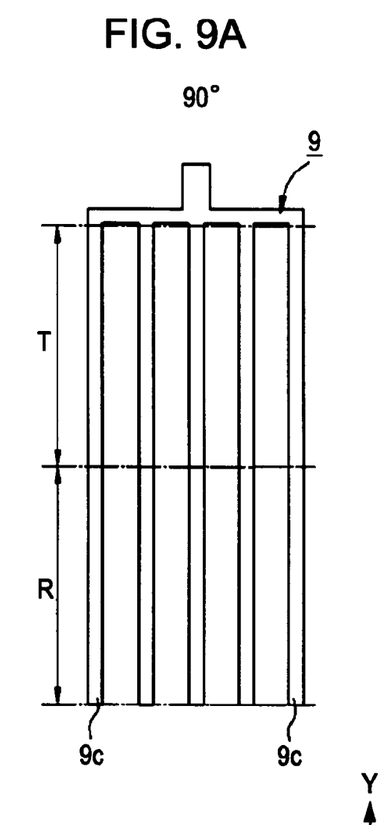
FIGS. 9A and 9B are explanatory diagrams illustrating different shapes of a pixel electrode in conditions shown in FIG. 4.
Figure 9B:
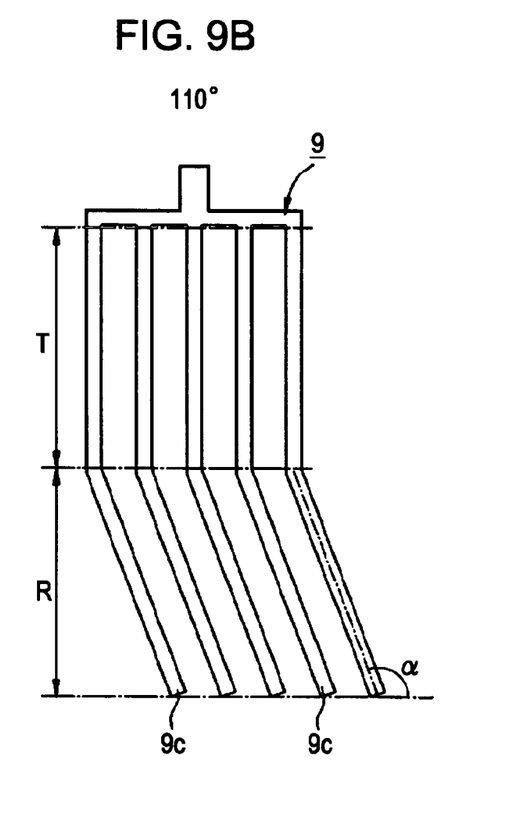

In FIG. 2A, the band-shaped electrodes (branched electrodes) 9c of the pixel electrode extend linearly over both areas of the transmissive display area T and the reflective display area R to be parallel to each other. However, the directions in which the band-shaped electrodes (branched electrodes) 9c extend may be different in the transmissive display area T and the reflective display area R and thus the band-shaped electrodes (branched electrodes) 9c disposed in the transmissive display area T and the band-shaped electrodes (branched electrodes) 9c disposed in the reflective display area R may be not parallel to each other. FIGS. 9A and 9B are plan views schematically illustrating the pixel electrode 9 and are used to explain difference in shape when the extension directions of the band-shaped electrodes (branched electrodes) 9c are different in the transmissive display area T and the reflective display area R. When angles are expressed in the range of 0° to 180° in the counterclockwise direction from the X axis, the extension directions of the band-shaped electrodes (branched electrodes) 9c in the reflective display area R are 90° in FIG. 2A (FIG. 9A). On the other hand, when the extension direction of the band-shaped electrodes (branched electrodes) 9c is different in the transmissive display area T and the reflective display area R, as shown in FIG. 9B, the band-shaped electrodes (branched electrodes) 9c are bent in the boundary between the transmissive display area T and the reflective display area R. The extension direction of the band-shaped electrodes (branched electrodes) in the reflective display area R shown in FIG. 9B forms about 110° with respect to the X axis. In any display area of the transmissive display area T and the reflective display area R, the extension direction of the band-shaped electrodes (branched electrodes) 9c is not limited to the direction parallel to the Y axis, but in the first embodiment, only the extension direction of the band-shaped electrodes (branched electrodes) 9c disposed in the reflective display area R is changed for the purpose of convenience and the angle thereof is set to α.

Arrangement of optical axes in the liquid crystal display device according to the first embodiment is shown in FIG. 2B.

A transmission axis 153 of the polarizing plate 14 on the side of the TFT array substrate 10 and a transmission axis 155 of the polarizing plate 24 on the side of the counter substrate 20 are perpendicular to each other, and the transmission axis 153 forms an angle θ in the counterclockwise direction about the X axis. The alignment layers 18 and 28 are initially aligned in the same direction (for example, by a rubbing process) in the transmissive display area T as seen two-dimensionally, and the direction thereof is a rubbing direction 151 of the transmissive display area shown in FIG. 2B, which is parallel to the transmission axis 153 of the polarizing plate 14 forming the angel of θ in the counterclockwise direction with respect to the X axis direction. The rubbing direction 151 of the transmissive display area is not limited to the direction shown in FIG. 2B, but is preferably a direction intersecting (a direction not parallel to) the main direction 157 of an electric field generated between the pixel electrode 9 and the common electrode 19 in the transmissive display area. In the transmissive display area T, the liquid crystal molecules aligned parallel to the rubbing direction 151 of the transmissive display area are tilted in the main direction 157 of the electric field, by means of application of a voltage between the pixel electrode 9 and the common electrode 19. Brightness is displayed on the basis of a difference between the initial alignment state and the alignment state at the time of application of a voltage.

It is assumed that a first-substrate-side rubbing direction 161 of the reflective display area has an angle φ1 in the counterclockwise direction with respect to the X axis direction, a second-substrate-side rubbing direction 162 of the reflective display area has an angle φ2 in the counterclockwise direction with respect to the X axis direction, and the liquid crystal molecules are twisted in the clockwise direction. However, the twisting direction is not limited to the counterclockwise direction. In the reflective display area R, the liquid crystal molecules of the liquid crystal layer 50 in the initial alignment state exhibit twisted alignment, the liquid crystal molecules being tilted in the main direction 157 of the electric field by means of application of a voltage between the pixel electrode 9 and the common electrode 19. Brightness is displayed on the basis of a difference between the initial alignment state of the liquid crystal molecules in the reflective display area R and the alignment state at the time of application of a voltage.

In the first embodiment, alignment is divided in the transmissive display area T and the reflective display area R, so that the alignment direction (rubbing direction) given to the alignment layer in the transmissive display area T and the alignment direction (rubbing direction) given to the alignment layer in the reflective display area R are different from each other. Although the rubbing process is performed to the alignment layers in the first embodiment to give an initial alignment direction to the liquid crystal molecules, the invention is not limited to the rubbing process, and the initial alignment direction may be given to the liquid crystal molecules by forming the alignment layers using an oblique evaporation method.

FIG. 4 shows relationships among an angle α of the band-shaped electrodes (branched electrodes) 9c disposed in the reflective display area R according to the first embodiment, a rubbing angle θ of the transmissive display area, an angle φ1 of the first-substrate-side rubbing direction 161 about the X axis in the reflective display area, an angle φ2 of the second-substrate-side rubbing direction 162 about the X axis in the reflective display area, and a cell thickness d of the reflective display area.

Figure 8:
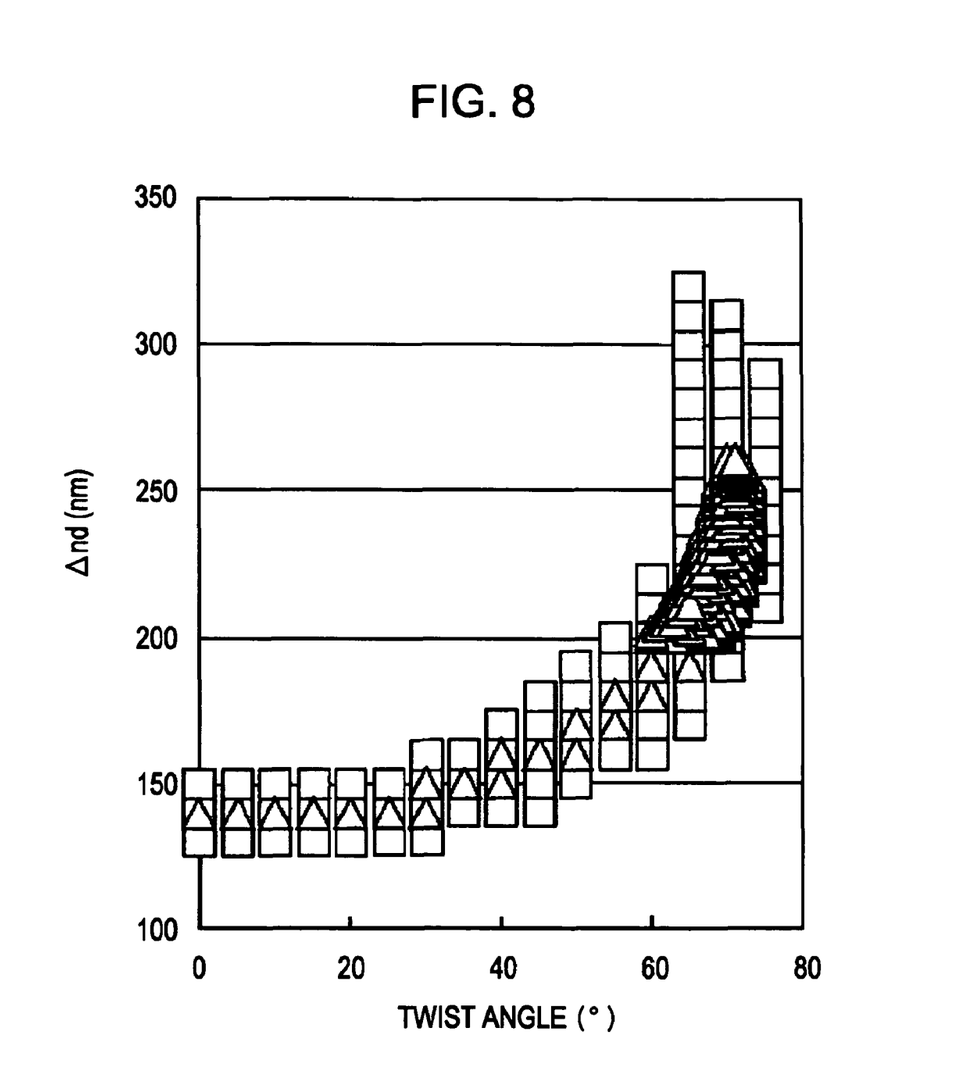
FIG. 8 is a graph illustrating relationships between a twist angle and Δnd in a reflective display area according to the first embodiment.

In FIG. 4, two kinds of relationships between the twist angle and Δnd in the reflective display area are shown, but the same advantages can be obtained even for other relationships between the twist angle and Δnd, as long as the black display can be obtained at the time of reflective display without application of a voltage. The relationships between the twist angle and Δnd in which excellent black display can be provided are shown in FIG. 8. FIG. 8 is a graph obtained by plotting conditions for obtaining proper reflective display when the twist angle (horizontal axis) of the liquid crystal molecules in the reflective display area R and Δnd (vertical axis) of the liquid crystal molecules in the liquid crystal display device 100 according to the first embodiment are varied. In the figure, the regions denoted by "☐" correspond to the conditions that the reflectance of the black display at the time of reflective display is 2% or less, and the regions denoted by "Δ" correspond to the more excellent conditions in which the reflectance is 1% or less.

Confirming the twist angle and Δnd for which the excellent reflective display can be obtained from the graph shown in FIG. 8, the twist angle is in the range of 0° to 80° and Δnd is in the range of 120 nm to 320 nm. By adjusting the twist angle and Δnd within these ranges, it is possible to obtain reflective display in which the reflectance of the black display is 2% or less. More preferably, the twist angle is in the range of 0° to 73° and Δnd is in the range of 140 nm to 261 nm. By adjusting the twist angle and Δnd to within this range, it is possible obtain more excellent reflective display in which the reflectance of the black display is 1% or less.

Figure 5:
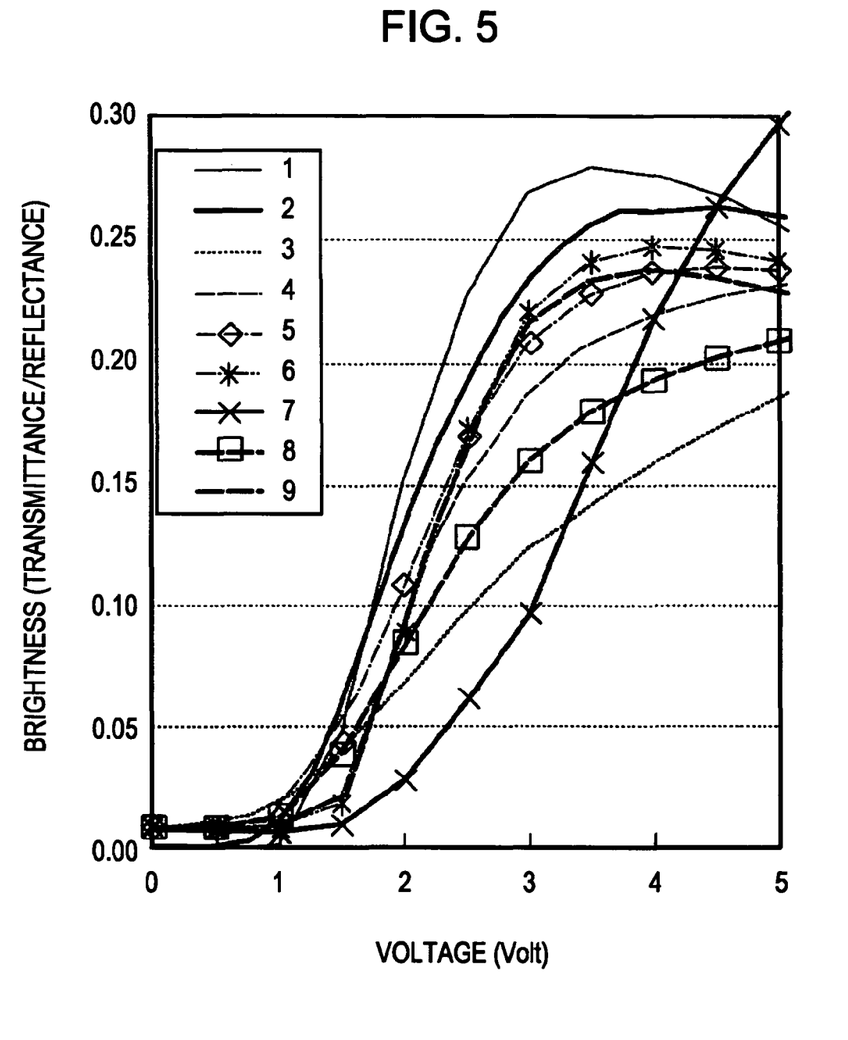
FIG. 5 is an explanatory diagram illustrating a relation between voltage and brightness among operational advantages according to the first embodiment.

Next, FIG. 5 shows variation in transmittance or reflectance with respect to voltages in the transmissive display and the reflective display shown in FIG. 4. In any case, black is displayed without application of a voltage and bright display can be obtained with application of a voltage. Specifically, by adjusting the angles to No. 2 in the transmissive display and to No. 9 in the reflective display, it is possible to make γ constant in the transmissive display and the reflective display.

By changing the thickness of the second interlayer insulating layer 13 provided between the pixel electrode 9 and the common electrode 19 in the transmissive display area and the reflective display area to make the amount of voltage drop in the liquid crystal layer different in the transmissive display area and the reflective display area, it is possible to minutely adjust the threshold voltage and to make γ constant in the transmissive display and the reflective display.

Figure 6:
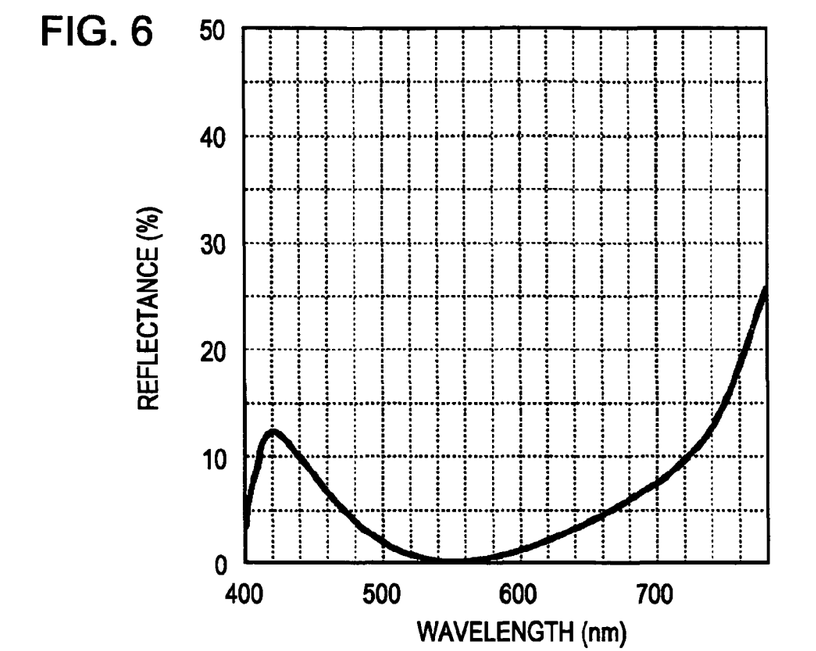
FIG. 6 is a graph illustrating a spectrum characteristic at the time of black display among operational advantages according to the first embodiment.

FIG. 6 is a graph illustrating a spectrum characteristic at the time of black display of a liquid crystal display device manufactured with the reflective display condition of No. 8 shown in FIG. 4. As shown in FIG. 6, sufficiently dark black display can be obtained from the liquid crystal display device, but the black display is slightly colored. Accordingly, depending upon the colors of the color filter 22, by making the blue cell thickness smaller (the thickness of the liquid crystal layer) and making the red cell thickness larger, it is possible to compensate for the spectrum characteristic shown in FIG. 6 and to obtain more excellent black display.

Although the FFS mode has been employed in the first embodiment, the same advantages can be obtained even when the IPS mode in which the liquid crystal molecules are driven with the electric field in the same in-plane direction of a substrate is employed.

Second Embodiment

Next, a second embodiment of the invention will be described with reference to FIGS. 10A, 10B, 11A, and 11B.

Figure 10A:
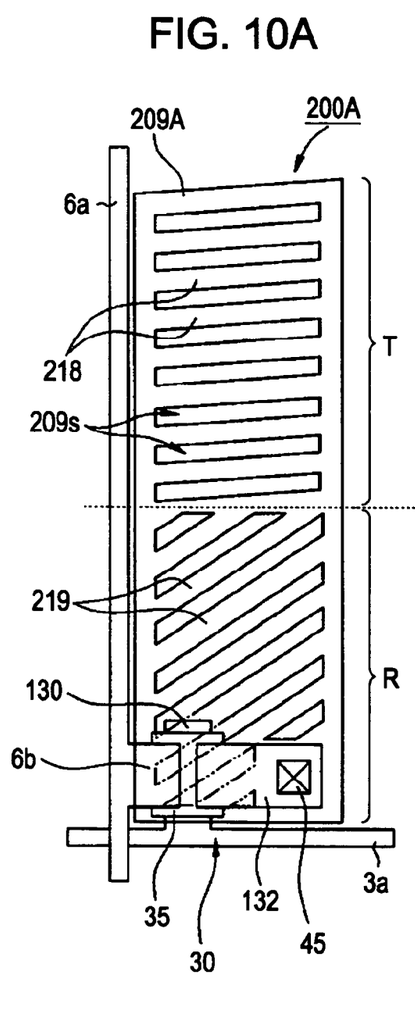
FIGS. 10A and 10B are plan views illustrating a sub-pixel in a liquid crystal display device according to a second embodiment.
Figure 10B:
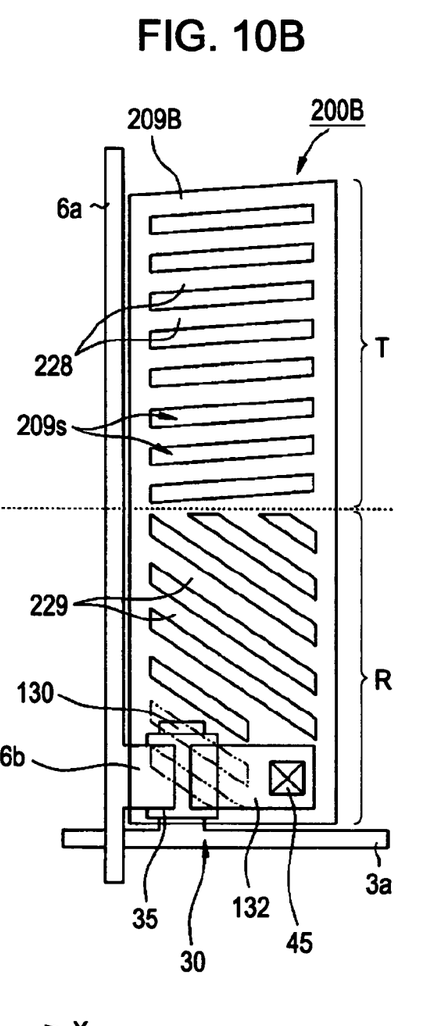

FIGS. 10A and 10B are plan views illustrating a sub-pixel and are used to explain liquid crystal display devices according to the second embodiment. The liquid crystal display devices 200A and 200B according to the second embodiment are transflective liquid crystal display devices with FFS mode having the same basic structure as the first embodiment. In the sub-pixels shown in FIGS. 10A and 10B, areas denoted by reference numeral T correspond to a transmissive display area and areas denoted by reference numeral R correspond to a reflective display area.

In addition, in FIGS. 10A, 10B, 11A, and 11B, the same elements as FIGS. 1 to 9 are denoted by the same reference numerals and detailed description thereof is omitted. The sectional structure of the liquid crystal display device is equal to that of the liquid crystal display device 100 according to the first embodiment, so long as particulars are not described.

The sub-pixel of the liquid crystal display device 200A shown in FIG. 10A is provided with a pixel electrode (first electrode) 209A, a data line 6a extending along a major edge of the pixel electrode 209A, a scanning line 3a extending along a minor edge of the pixel electrode 209A, and a TFT 30 formed to correspond to an intersection between the scanning line 3a and the data line 6a. The TFT 30 is electrically connected to the pixel electrode 209A through a contact hole 45 formed in the plane area of the drain electrode 132.

Although not shown, the same common electrode (second electrode) as shown in FIG. 2 is formed in a two-dimensional solid shape including the pixel electrode 209A and the retardation layer is formed on the area two-dimensionally overlapping the reflective display area R.

The outline of the pixel electrode 209A is a substantially rectangular shape as seen two-dimensionally and a plurality of slits 209s is formed therein. The shape or the extension direction of the slits 209s is different in a portion, which corresponds to the transmissive display area T, of the plane area of the pixel electrode 209A and a portion which corresponds to the reflective display area T. That is, in the portion, which corresponds to the transmissive display area T, of the pixel electrode 209A shown in FIG. 10A, a plurality of band-shaped electrodes (branched electrodes) 218 formed by the slits 209s extends to the right-upper side in the figure (in a direction forming 5° with respect to the X axis) and in the portion corresponding to the reflective display area R, a plurality of band-shaped electrodes 219 formed similarly by the slits 209s extends in a direction forming 45° with respect to the X axis.

Figure 11A:
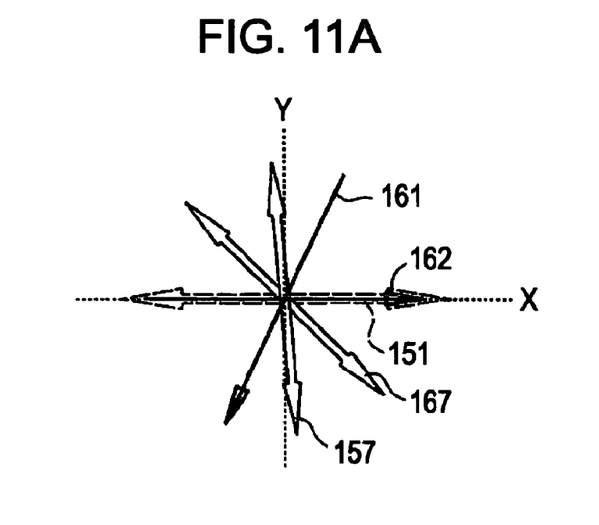
FIGS. 11A and 11B are explanatory diagrams illustrating arrangement of optical axes of the liquid crystal display device shown in FIGS. 10A and 10B.

FIG. 11A is an explanatory diagram illustrating arrangement of optical axes in the liquid crystal display device 200A shown in FIG. 10A. As shown in the figure, the rubbing direction 151 of the transmissive display area, which is an alignment regulating direction of the alignment layers 18 and 28 in the transmissive display area T, is parallel to (forms 0° with respect to) the X axis and the first-substrate rubbing direction 161 of the reflective display area, which is an alignment regulating direction of the alignment layer 18 in the reflective display area T on the TFT array substrate (first substrate) 10, forms 65° with respect to the X axis. The second-substrate rubbing direction 162 of the reflective display area, which is an alignment regulating direction of the alignment layer 28 in the reflective display area R on the counter substrate (second substrate) 20, is parallel to (forms 0° with respect to) the X axis. Accordingly, in the liquid crystal display device 200A according to the second embodiment, the alignment layer 18 of the TFT array substrate 10 is subjected to an alignment division process (a multi rubbing process or the like), and the alignment layer of the counter substrate 20 is subjected to only an alignment process in the direction parallel to the X axis.

On the other hand, the sub-pixel of the liquid crystal display device 200B shown in FIG. 10B is provided with a pixel electrode (second electrode) 209B, a data line 6a extending along a major edge of the pixel electrode 209B, a scanning line 3a extending along a minor edge of the pixel electrode 209B, and a TFT 30 formed to correspond to an intersection between the scanning line 3a and the data line 6a. The TFT 30 is electrically connected to the pixel electrode 209B through a contact hole 45 formed in the plane area of the drain electrode 132. The configurations of the common electrode (second electrode) and the reflective layer are similar to those of the liquid crystal display device 100 according to the first embodiment described above.

The outline of the pixel electrode 209B has a substantially rectangular shape as seen in the same plane as the pixel electrode 209A, and a plurality of slits 209s is formed therein. In the portion, which corresponds to the transmissive display area T, of the pixel electrode 209B shown in FIG. 10B, a plurality of band-shaped electrodes (branched electrodes) 228 formed by the slits 209s extends to the right-upper side in the figure (in a direction forming 5° with respect to the X axis) and in the portion corresponding to the reflective display area R, a plurality of band-shaped electrodes 229 formed similarly by the slits 209s extends in a direction forming −45° with respect to the X axis. That is, in the sub-pixel shown in FIG. 10B and the sub-pixel shown in FIG. 10A, the extension directions of the band-shaped electrodes (branched electrodes) 229 disposed in the reflective display area R are symmetrical about the Y axis.

Figure 11B:
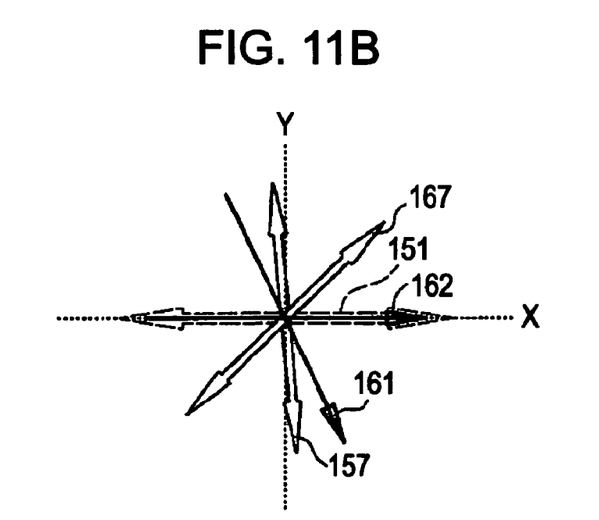

FIG. 11B is an explanatory diagram illustrating arrangement of optical axes in the liquid crystal display device 200B shown in FIG. 10B. As shown in the figure, the rubbing direction 151 of the transmissive display area, which is an alignment regulating direction of the alignment layers 18 and 28 in the transmissive display area T, is parallel to (forms 0° with respect to) the X axis and the first-substrate rubbing direction 161 of the reflective display area, which is an alignment regulating direction of the alignment layer 18 in the reflective display area T on the TFT array substrate (first substrate) 10, forms −65° with respect to the X axis. The second-substrate rubbing direction 162 of the reflective display area, which is an alignment regulating direction of the alignment layer 28 in the reflective display area R on the counter substrate (second substrate) 20, is parallel to (forms 0° with respect to) the X axis. Accordingly, in the liquid crystal display device 200B according to the second embodiment, the alignment layer 18 of the TFT array substrate 10 is subjected to an alignment division process (a multi rubbing process or the like), and the alignment layer of the counter substrate 20 is subjected to only an alignment process in the direction parallel to the X axis.

In the liquid crystal display devices 200A and 200B according to the second embodiment having the above-mentioned configurations, similarly to the liquid crystal display device 100 according to the first embodiment, the initial alignment of the liquid crystal molecules is the parallel alignment in the transmissive display area T and the twisted alignment in the reflective display area R. Normally black display is possible for both of the transmissive display and the reflective display, as described with reference to FIGS. 4 to 9.

By making different the tilting angles of the band-shaped electrodes (branched electrodes) 218 and 228 disposed in the transmissive display area T with respect to the X axis, it is possible to adjust the electro-optical characteristic of the transmissive display. In the reflective display area R, by adjusting the tilting angle of the band-shaped electrodes (branched electrodes) 219 and 229 disposed in the reflective display area R with respect to the X axis, it is possible to adjust the electro-optical characteristic of the reflective display, thereby making the γ characteristic of the reflective display be equal to that of the transmissive display.

Comparing the liquid crystal display devices 200A and 200B shown in FIGS. 10A and 10B with each other, the extension directions of the band-shaped electrodes (branched electrodes) 219 and 229 disposed in the reflective display area R are symmetric about the Y axis, and the first-substrate rubbing directions 161 of the reflective display area are also symmetric about the Y axis. As a result, the tilting direction (alignment direction) of the liquid crystal molecules in the reflective display area R at the time of application of a selection voltage is different in the liquid crystal display device 200A and the liquid crystal display device 200B. Specifically, in the liquid crystal display device 200A, the alignment direction of the liquid crystal molecules varies in the clockwise direction as seen two-dimensionally, but in the liquid crystal display device 200B, the alignment direction of the liquid crystal molecules varies in the counterclockwise direction. Here, in the liquid crystal display device 200A, since the alignment direction of the liquid crystal molecules in the transmissive display area T varies in the counterclockwise direction at the time of application of a selection voltage, disclination can be easily generated in the boundary between the reflective display area R in which the alignment direction of the liquid crystal molecules varies in the clockwise and the transmissive display area T. The disclination deteriorates the brightness of the sub-pixel. On the contrary, in the liquid crystal display device 200B, since the direction in which the alignment direction of the liquid crystal molecules at the time of application of a selection voltage is constant in the transmissive display area T and the reflective display area R, no disclination is generated in the boundary between the transmissive display area T and the reflective display area R. As a result, it is possible to display an image with high brightness and to obtain an excellent response property.

Although the FFS mode has been employed in the second embodiment, the same advantages can be obtained from an in-plane switching (IPS) mode in which the liquid crystal molecules operate with the substrate-in-plane electric field, similarly.

Electronic Apparatus

Figure 7:
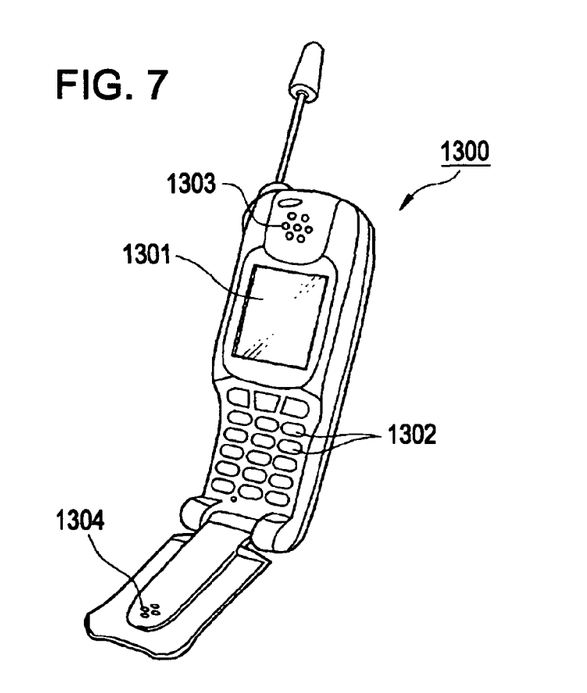
FIG. 7 is a perspective view illustrating an example of an electronic apparatus.

FIG. 7 is a perspective view illustrating a mobile phone as an example of an electronic apparatus having the liquid crystal display device according to the invention as a display unit. The mobile phone 1300 has the liquid crystal display device according to the invention as a small-sized display unit 1301 and includes a plurality of operation buttons 1302, an earpiece 1303, and a mouthpiece 1304.

The liquid crystal display device according to the abovementioned embodiments can be very suitably used as an image display unit for an electronic book, a personal computer, a digital still camera, a liquid crystal television, a view finder type or monitor direct-view type video tape recorder, a car navigation apparatus, a pager, an electronic pocketbook, an electronic calculator, a word processor, a work station, a television phone, a POS terminal, an apparatus having a touch panel, and the like, in addition to the mobile phone. Accordingly, it is possible to obtain transmissive display and reflective display with high brightness and contrast and a wide viewing angle.

What is claimed is:

1. A liquid crystal display device, comprising:
    a first substrate;
    a second substrate opposed to the first substrate;
    a liquid crystal layer, having liquid crystal molecules, disposed between the first and second substrates;
    a first electrode and a second electrode provided on a side of the first substrate opposed to the liquid crystal layer, the first electrode including a plurality of band-shaped electrodes;
    a scanning line provided on the first substrate;
    an insulating layer provided between the first electrode and the second electrode, the liquid crystal layer being driven by an electric field generated between the first electrode and the second electrode; and
    a reflective display area for reflective display and a transmissive display area for transmissive display formed in a sub-pixel area;
    wherein an alignment of the liquid crystal molecules of the liquid crystal layer is different in the transmissive display area relative to the reflective display area,
    wherein the first electrode and the second electrode are provided in both the reflective display area and the transmissive display area,
    wherein the band-shaped electrodes of the first electrode extend parallel to each other in both the reflective display area and the transmissive display area;
    wherein the band-shaped electrodes of the first electrode extend substantially perpendicular to the scanning line in the transmissive area and bend at an angle of approximately 20° at a boundary between the transmissive area and the reflective area, and
    wherein a rotating direction of the liquid crystal molecules at the time of application of a voltage between the first electrode and the second electrode in the transmissive display area, and a rotating direction of the liquid crystal molecules at the time of application of a voltage between the first electrode and the second electrode in the reflective display area, are equal to each other.

2. The liquid crystal display device according to claim 1, the alignment being parallel in the transmissive display area, and twisted in the reflective display area.

3. The liquid crystal display device according to claim 2, a twist angle in the reflective display area being in a range of 0° to 80°, and a product ($\Delta$nd) of a cell thickness (d) and a refractive index difference ($\Delta$n) being in a range of 120 nm to 320 nm.

4. The liquid crystal display device according to claim 3, the twist angle in the reflective display area being in a range of 0° to 73°, and the product ($\Delta$nd) of the cell thickness (d) and the refractive index difference ($\Delta$n) being in a range of 140 nm to 261 nm.

5. The liquid crystal display device according to claim 1, further including a color filter in the reflective display area, a cell thickness being different depending upon the color of the color filter.

6. The liquid crystal display device according to claim 1, an angle of the first electrode being different in the reflective display area relative to the transmissive display area.

7. The liquid crystal display device according to claim 1, a voltage applied between the first electrode and the second electrode being different in the reflective display area relative to the transmissive display area.

8. The liquid crystal display device according to claim 1, the first electrode having a plurality of band-shaped electrodes extending in the sub-pixel area, and an extension direction of the plurality of band-shaped electrodes in the reflective display area being disposed between an alignment regulation direction of an alignment layer on the side of the first substrate and an alignment regulation direction of an alignment layer on the side of the second substrate as viewed two-dimensionally.

9. An electronic apparatus, comprising:
    the liquid crystal display device according to claim 1.

* * * * *